(12) United States Patent
Miyaki

(10) Patent No.: US 7,076,741 B2
(45) Date of Patent: Jul. 11, 2006

(54) POINT-OF-INTEREST ICON AND POINT-OF-INTEREST MARK DISPLAY METHOD

(75) Inventor: Ken Miyaki, Los Angeles, CA (US)

(73) Assignee: Alpine Electronics, Inc., Tokyo (JP)

( * ) Notice: Subject to any disclaimer, the term of this patent is extended or adjusted under 35 U.S.C. 154(b) by 490 days.

(21) Appl. No.: 09/809,804

(22) Filed: Mar. 16, 2001

(65) Prior Publication Data

US 2002/0130906 A1 Sep. 19, 2002

(51) Int. Cl.
*G06F 3/00* (2006.01)
*G06F 9/00* (2006.01)
*G06F 17/00* (2006.01)

(52) U.S. Cl. .......... 715/837; 715/712
(58) Field of Classification Search ........ 345/712, 345/837, 968; 701/208
See application file for complete search history.

(56) References Cited

U.S. PATENT DOCUMENTS

| | | | |
|---|---|---|---|
| 5,790,121 A * | 8/1998 | Sklar et al. ............ | 345/853 |
| 6,025,843 A * | 2/2000 | Sklar ..................... | 345/841 |
| 6,085,216 A * | 7/2000 | Huberman et al. ...... | 718/104 |
| 6,259,679 B1 * | 7/2001 | Henderson et al. ..... | 370/254 |
| 6,336,073 B1 * | 1/2002 | Ihara et al. ............ | 701/202 |
| 6,392,667 B1 * | 5/2002 | McKinnon et al. ..... | 715/738 |
| 6,397,143 B1 * | 5/2002 | Peschke ................ | 701/208 |
| 6,426,761 B1 * | 7/2002 | Kanevsky et al. ...... | 715/788 |
| 2001/0028367 A1 * | 10/2001 | Saitoh et al. .......... | 345/835 |

* cited by examiner

*Primary Examiner*—Kristine Kincaid
*Assistant Examiner*—Boris Pesin
(74) *Attorney, Agent, or Firm*—Brinks Hofer Gilson & Lione

(57) ABSTRACT

In a point-of-interest (POI) icon display method for displaying a POI icon at a position of a point of interest on a map, when a large number of POI icons are densely displayed, one representative icon is displayed instead of these POI icons. When the representative icon is selected, the original individual POI icons or detailed information of the POIs corresponding to the original individual POI icons are displayed. In a case in which a POI is displayed by a polygon on the map and the POI icon is present within the POI polygon, the POI icon is displayed in the central portion of the polygon.

10 Claims, 13 Drawing Sheets

FIG. 3
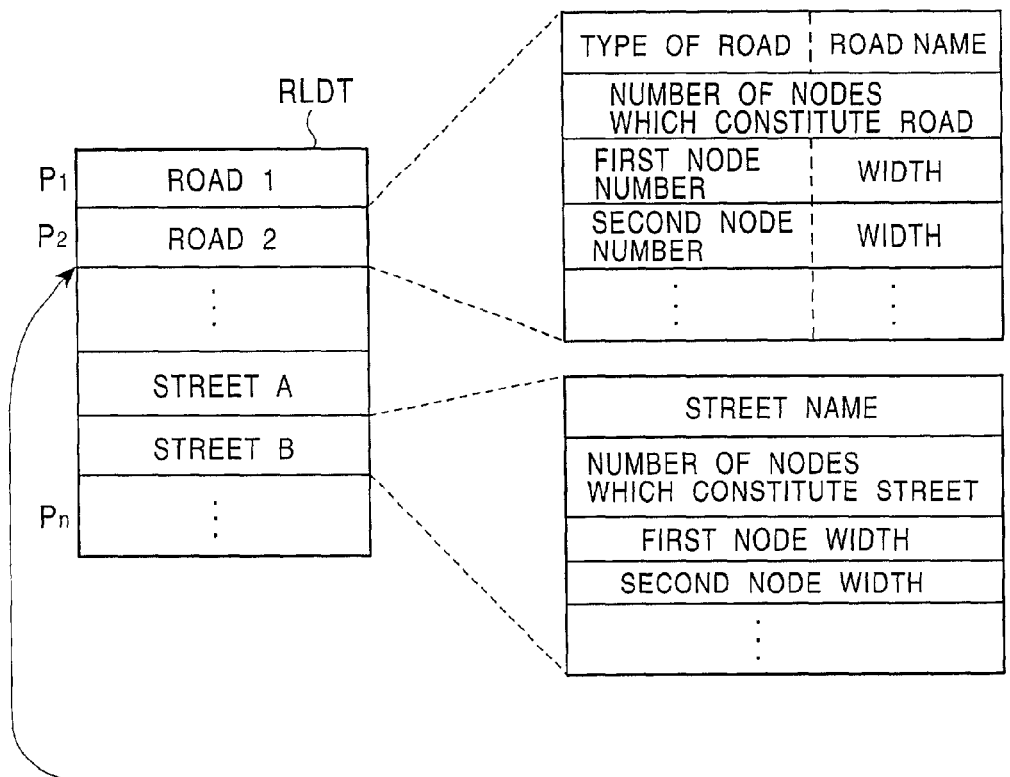
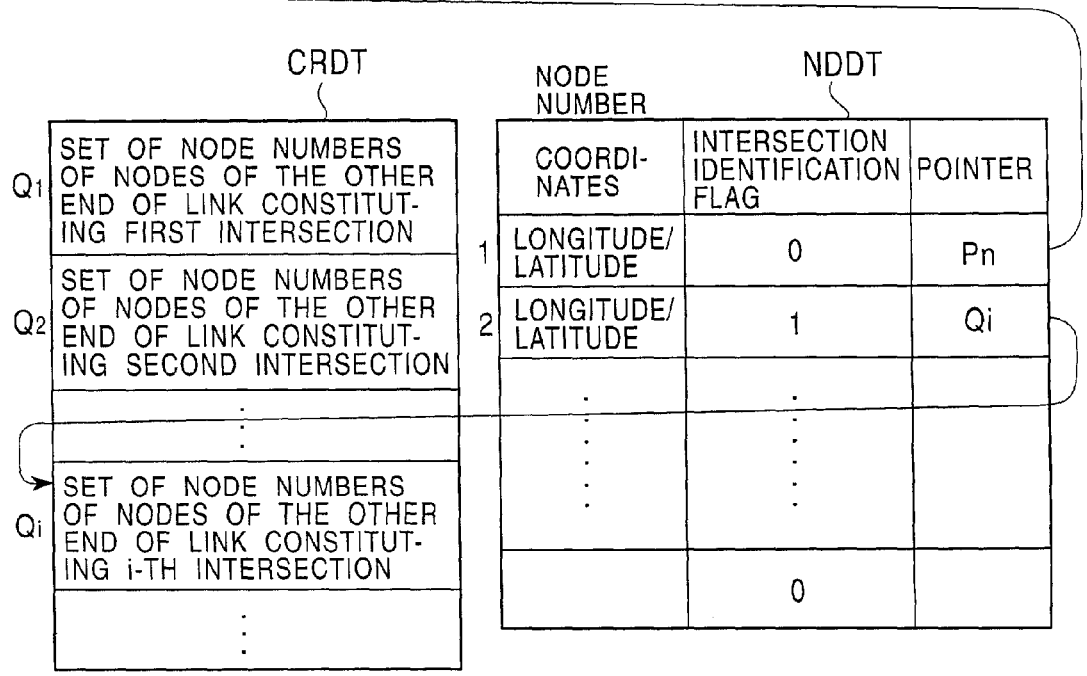

(a)

| COORDINATES (LONGITUDE / LATITUDE) | POI ICON RECORD | NAME OF ADJACENT ROAD | LINK (NODES $N_1$ AND $N_2$) | CATEGORY | NAME |
|---|---|---|---|---|---|
| $(x_1, y_1)$ | R | ABC AVE. | ..... | RESTAURANT | BBB RESTAURANT |
| ..... | ..... | ..... | ..... | ..... | ..... |

(b)

FIG. 12A
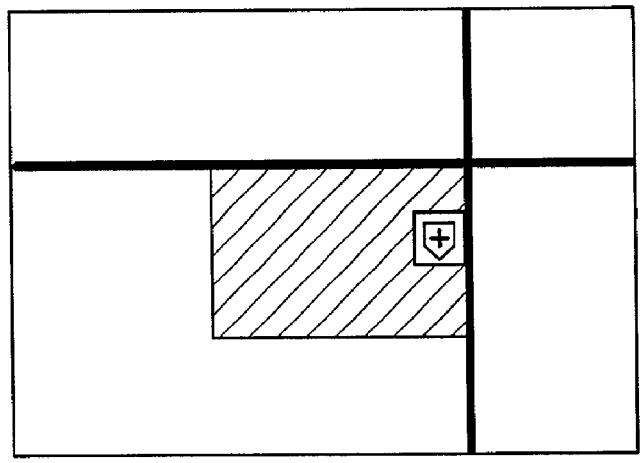
 : HOSPITAL
FIG. 12B
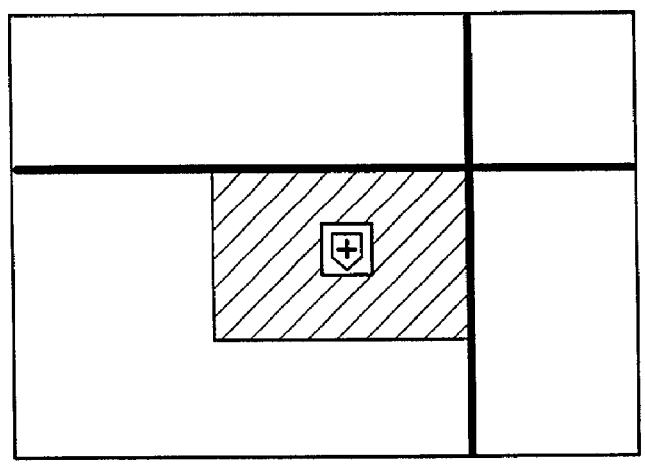
 : HOSPITAL

R : RESTAURANT
$ : BANK
A : ATM

: HOSPITAL

POINT-OF-INTEREST ICON AND POINT-OF-INTEREST MARK DISPLAY METHOD

BACKGROUND OF THE INVENTION

The present invention relates to a point-of-interest (POI) icon display method. More particularly, the present invention relates to a POI icon display method for displaying a POI icon at the position of a point of interest on a map.

A navigation apparatus for performing vehicle guidance so that the driver may easily reach a desired location detects the position of the vehicle and reads map data for the area surrounding the vehicle position from a map storage medium, such as a CD-ROM or a DVD (Digital Versatile Disk). Subsequently, in a map guide mode, a map and guidance routes are drawn on a display screen, and a vehicle position mark is drawn superimposed at a predetermined position on the map. Then, as the present position changes as the vehicle moves, the vehicle position mark on the screen is moved along the guidance route, or the map is scrolled with the vehicle position mark remaining fixed at a predetermined position so that the detailed map of the area surrounding the vehicle position can always be seen at a glance. In an arrow guide mode, guidance routes and intersecting roads are briefly displayed, and the traveling direction at the intersection is indicated by an arrow. Also, the distance to an intersection, the direction of a target location, the distance to the target location, etc., are displayed, and the traveling direction at the intersection is guided by voice instruction.

Such a navigation apparatus has functions for displaying, on a map, icons indicating POIs (POI icons), such as ATMs (Automatic Teller Machines), banks, gas stations, restaurants, hotels, parking lots, etc. FIG. 13 shows an example of a conventional display of POI icons in a city, in which POI icons of restaurants, hotels, and ATMs are displayed. However, there is a problem in that in a city, since there are numerous POIs, the roads on the map may be obscured by the icons.

The navigation apparatus displays POI (facilities) having large premises, such as parks, hospitals, and factories, using polygons, as shown in FIG. 14, and displays, within the polygon, a mark (POI icon) indicating the category of the POI along the road. When this POI icon is pointed to by a cursor and the enter key is pressed, the navigation apparatus displays detailed information about the selected POI. However, since the POI icon is displayed at an end of the polygon, it is difficult to see the POI icon, and moreover, when the POI icon is at an end of a polygon, it is difficult to point to the POI icon using the cursor, and there is a problem in that another nearby POI icon might be selected erroneously.

BRIEF SUMMARY OF THE INVENTION

A first object of the present invention is to make it easy to see roads on a map by reducing the number of POI icons displayed on the map.

A second object of the present invention is to automatically display a POI icon in the central portion of a POI polygon.

According to the present invention, the first object can be achieved by a POI icon display method comprising the steps of: (1) displaying one representative icon when POI icons overlap or when POI icons are densely distributed; and (2) displaying the original individual POI icons or detailed information of the POIs corresponding to the original individual POI icons when the representative icon is selected.

According to the present invention, the second object can be achieved by a POI icon display method comprising the steps of: (1) displaying a POI on a map by using a polygon; and (2) displaying the POI icon which is present within the POI polygon in the central portion of the polygon.

Other features and advantages of the present invention will be apparent from the following description taken in conjunction with the accompanying drawings.

BRIEF DESCRIPTION OF SEVERAL VIEWS OF THE DRAWINGS

FIG. 3 is an illustration of road layers;

FIGS. 9A and 9B show an example of the display in the case in which a multiple-icon icon is pointed to;

FIGS. 12A and 12B show an example of the display of a POI icon according to the second embodiment of the present invention;

DETAILED DESCRIPTION OF THE INVENTION

(A) Construction of Navigation Apparatus

Figure 1:
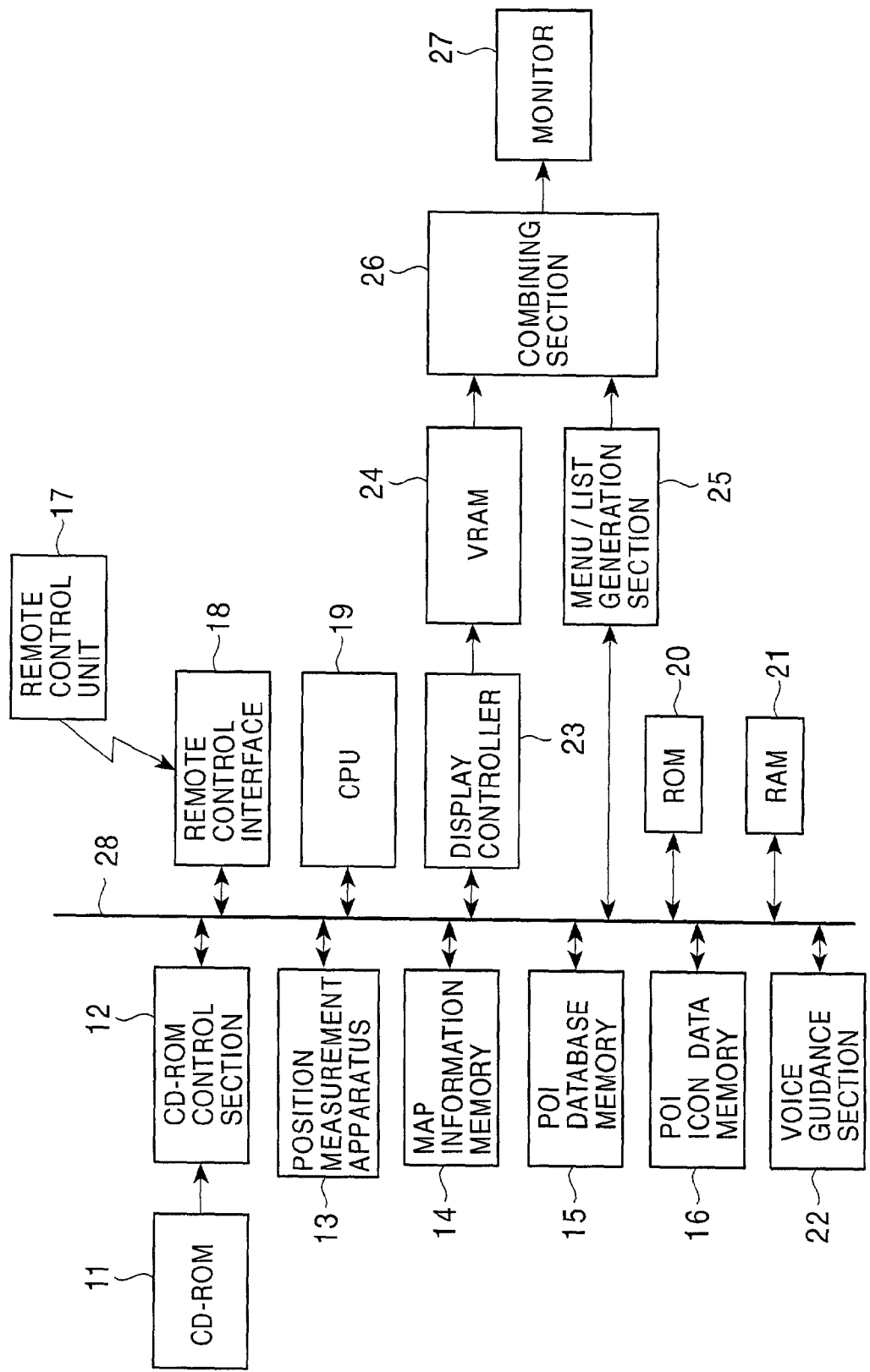
FIG. 1 is a block diagram of a navigation apparatus according to the present invention.

FIG. 1 is a block diagram of a navigation apparatus according to the present invention. Referring to FIG. 1, reference numeral 11 denotes a map information storage medium, for example, a CD-ROM, for storing map information. Reference numeral 12 denotes a CD-ROM control section for controlling the reading of map information from the CD-ROM. Reference numeral 13 denotes a position measurement apparatus, for measuring the current position of the vehicle, which comprises a vehicle velocity sensor for detecting a distance moved, a gyroscope for detecting the orientation of the movement, a CPU for position calculations, a GPS (Global Positioning System) receiver, etc. Reference numeral 14 denotes a map information memory for storing the map information read from the CD-ROM. Reference numeral 15 denotes a POI database memory for storing the POI database information read from the CD-ROM. Reference numeral 16 denotes a POI icon data memory for storing POI icon data.

Figure 2:
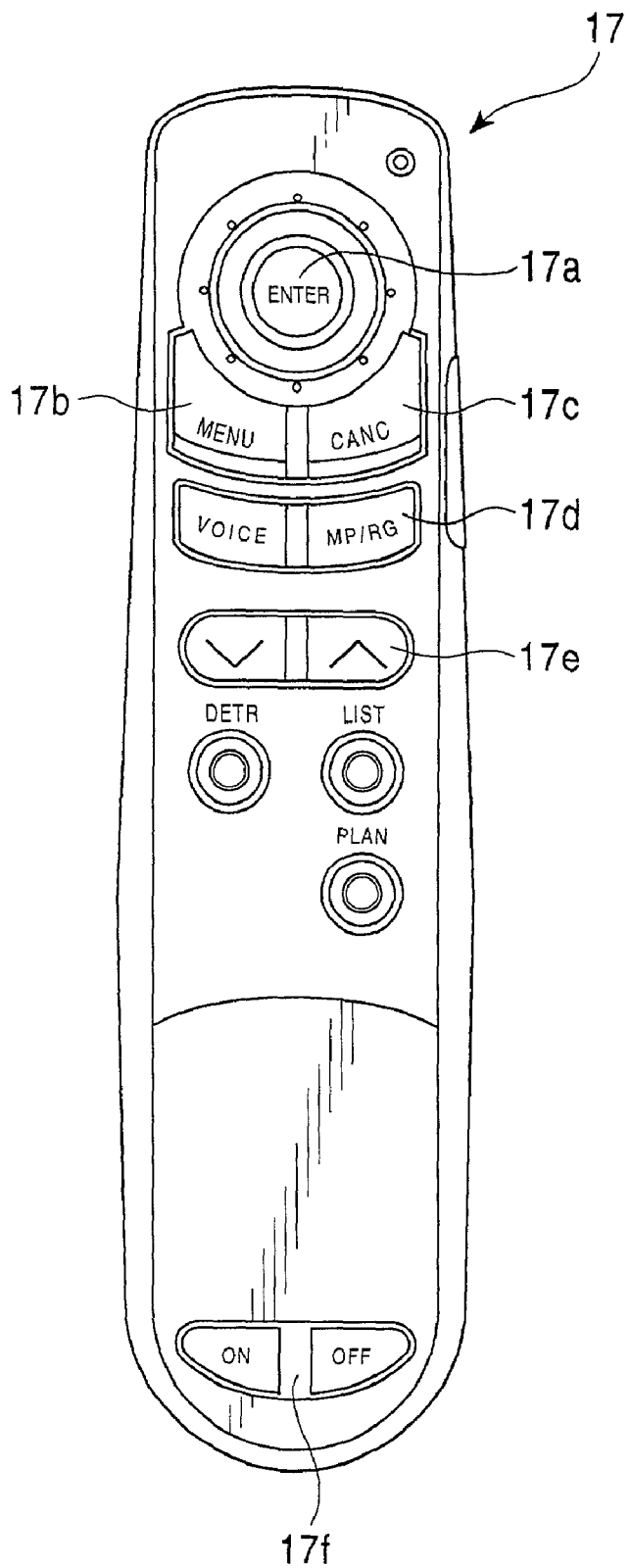
FIG. 2 is an illustration of a remote control unit.

Reference numeral 17 denotes a remote control unit for performing a menu selection operation, an enlargement/reduction operation, a target location input operation, etc. Reference numeral 18 denotes a remote control interface. As shown in FIG. 2, the remote control unit 17 comprises a joystick/enter key 17a, a menu key 17b, a cancel key 17c, an MP/RG key 17d, a zoom/scroll key 17e, a monitor on/off key 17f, etc. The joystick/enter key 17a functions as a joystick key for moving the cursor, the user's vehicle mark, etc., in eight directions in a relative manner on the map and for moving a menu bar (highlighted position) when a desired menu item is to be selected, and functions as an enter key for setting and inputting the cursor position and for selecting and inputting menus. The menu key 17b is operated when a main menu is displayed, and the cancel key 17c is operated when the current display screen is cancelled or when returning to the previous screen of the menu. The zoom/scroll key 17e is operated when switching between a map guide mode and an arrow guide mode. The zoom/scroll key 17e is operated when the map is enlarged or reduced and when vertical shift or scroll of the highlighted position is performed in various lists.

Referring back to FIG. 1, reference numeral 19 denotes a processor (CPU) for controlling the entire navigation apparatus. Reference numeral 20 denotes a ROM for storing various control programs. Reference numeral 21 denotes a RAM for storing processing results, such as guidance routes. Reference numeral 22 denotes a voice guidance section for performing, by voice instruction, guidance for the traveling direction at an intersection. Reference numeral 23 denotes a display controller for creating a map guide image and an arrow guide image on the basis of the map information. Reference numeral 24 denotes a VRAM (Video RAM) for storing images created by the display controller 23. Reference numeral 25 denotes a menu/list creation section for creating a menu image/various list images. Reference numeral 26 denotes a combining section. Reference numeral 27 denotes a monitor apparatus or display. Reference numeral 28 denotes a bus.

(B) Map Information

The map information is composed of (1) road layers, (2) background layers for displaying objects on a map, (3) character layers for displaying characters, such as names of cities, towns, and villages, (4) POI icon layers for displaying POI icons appropriately at predetermined positions of POIs, and other matters. Of these, as shown in FIG. 3, the road layers have road link data RLDT, node data NDDT, and intersection data CRDT, and are used for guidance route search processing, map matching processing, etc.

The road link data RLDT, which supplies attribute information of a corresponding road, is composed of data such as the number of all the nodes in a road link, the number of each node which is a constituent of the road, a road number (road name), and type of road (national road, superhighway, prefecture road, or other type of road). Also, the intersection data CRDT is a set of nodes (referred to as "nodes constituting an intersection") closest to the intersection from among the nodes on the link, which are coupled to the intersection. The node data NDDT is a list of all the nodes constituting the road, and is composed of positional information (longitude, latitude) for each node, an intersection identification flag as to whether or not the node is an intersection, a pointer which points to intersection data when the node is an intersection and which points to a road link to which the node belongs when the node is not an intersection, etc.

Figure 4A:
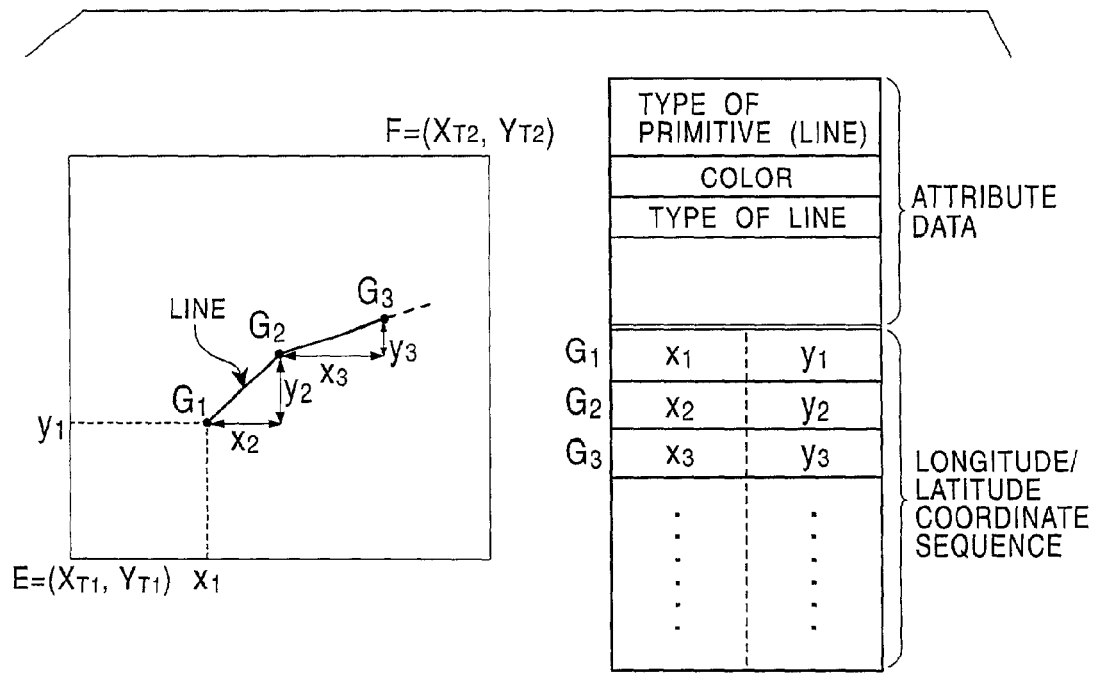
FIGS. 4A and 4B are illustrations of figure data of background layers.
Figure 4B:
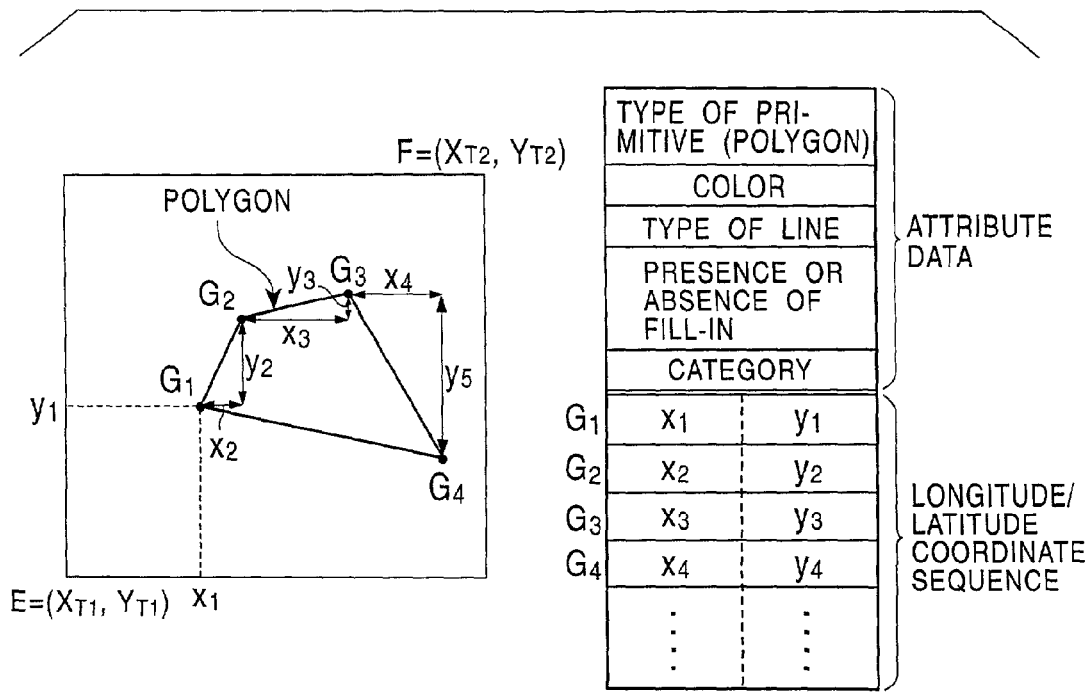

The background layer is divided into units which are divided into predetermined longitude widths and latitude widths, and has figure data representing plane figures, such as roads, buildings, parks, rivers, lakes, etc., in each unit. As shown in FIGS. 4A and 4B, the range in the absolute longitude and latitude coordinates (X, Y) of each unit is determined by the absolute longitude and latitude coordinates $(X_{T1}, Y_{T1})$ and $(X_{T2}, Y_{T2})$ of diagonal vertexes E and F. As shown in FIGS. 4A and 4B, the figure data of each unit contains (1) attributes, such as type of primitive, such as a line or a polygon; color; and type of line, and in addition, (2) in the case of a line, transition points as, for example, a longitude/latitude coordinate sequence $(x_1, y_1), (x_2, y_2), \ldots, (x_n, y_n)$ of each of the element points $G_1$ to $G_n$, and in the case of a polygon, the presence or absence of fill-in, and vertexes as, for example, a longitude/latitude coordinate sequence $(x_1, y_1), (x_2, y_2), \ldots, (x_n, y_n)$ of each of the element points $G_1$ to $G_n$. Also, in the case of a polygon, the figure data contains data indicating the category (hotels, restaurants, airports, stations, shopping centers, sports facilities, hospitals, golf courses, etc.) of building and facilities represented by polygons.

Figure 5:
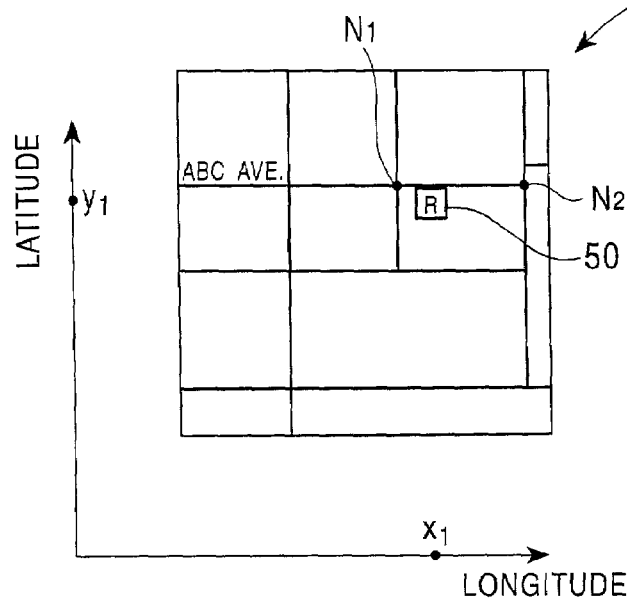
FIG. 5 is an illustration of icon data of a POI icon layer.

The POI icon layer is divided according to each unit, and POI icon data shown in FIG. 5(a) is stored for each POI present inside the unit. The POI icon data has:

(1) Longitude and latitude positions of a POI (position at which the POI icon is displayed),
(2) POI icon code,
(3) Name of road the POI faces,
(4) Link-constituting nodes of road link in which the POI is present,
(5) Category of the POI, and
(6) Name of the POI In the example of FIG. 5A, a POI icon 50 is displayed along ABC Avenue at a predetermined position on a map at which BBB restaurant is located, as shown in FIG. 5(b).

(C) POI Database

Figure 6:
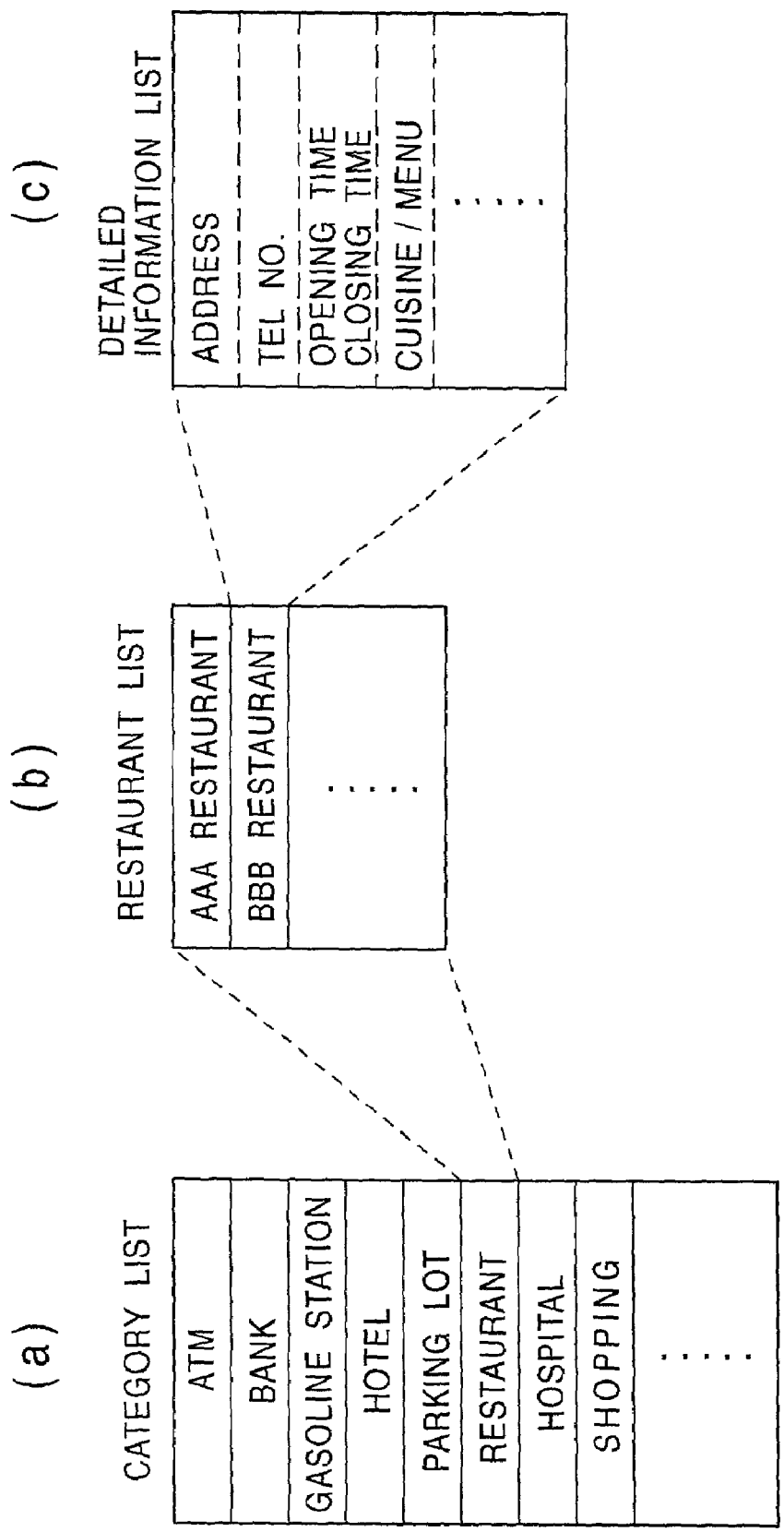
FIG. 6 is an illustration of a POI database.

The POI database memory 15 has stored therein a large number of POIs corresponding to various categories, and furthermore, stores the addresses of POIs, telephone numbers, longitude and latitude positions, categories, information specific to POIs, etc., corresponding to each POI. FIG. 6(a) shows a category list. FIG. 6(b) shows a POI list of restaurants in the restaurant category. FIG. 6(c) shows a list of detailed information for BBB restaurant as a POI in the restaurant category. This POI database is used to set target locations.

(D) First Embodiment

Figure 7:
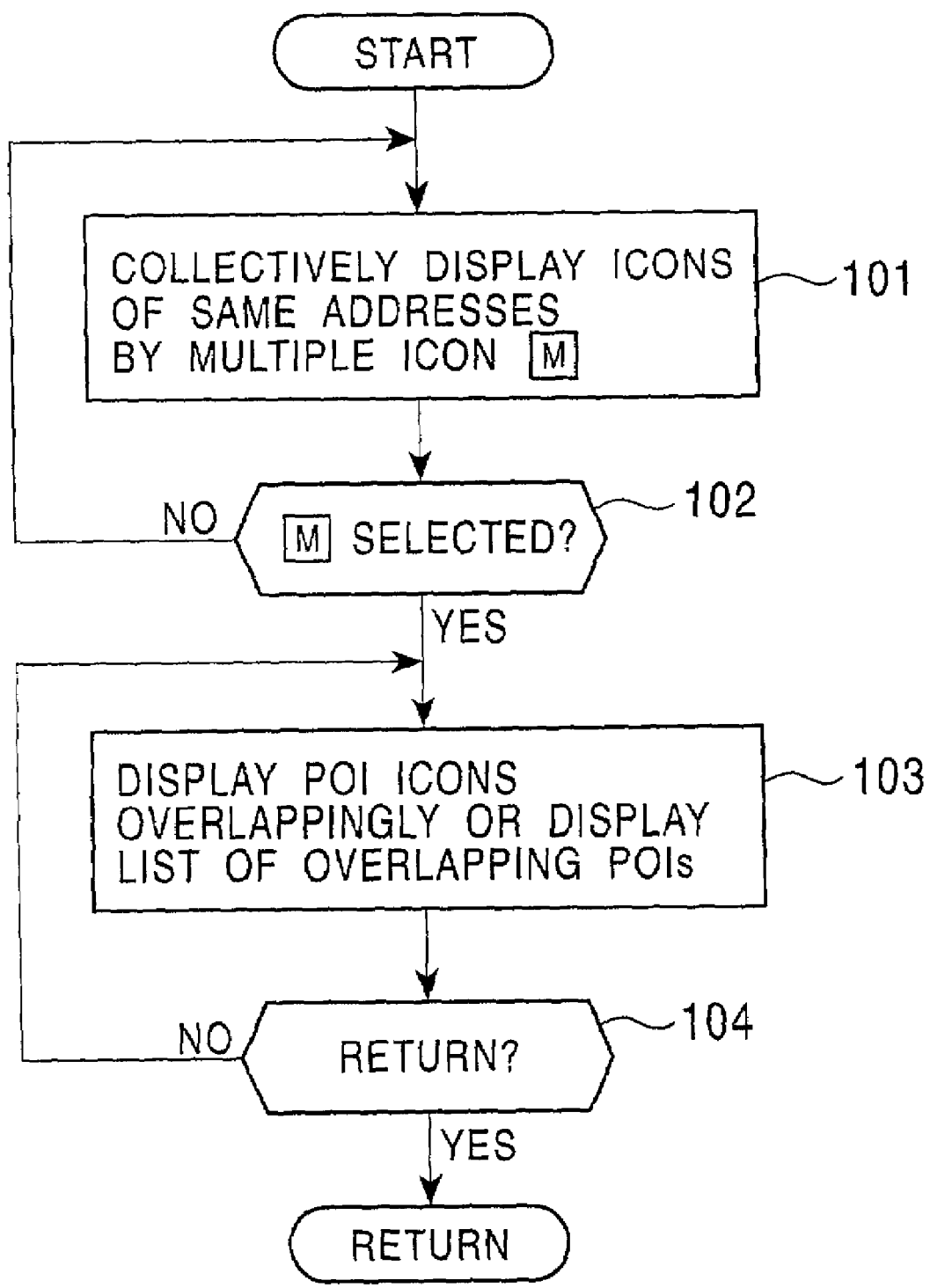
FIG. 7 is a flowchart of a POI icon display process according to a first embodiment of the present invention.

FIG. 7 is a flowchart of a POI icon display process according to a first embodiment of the present invention.

Figure 8:
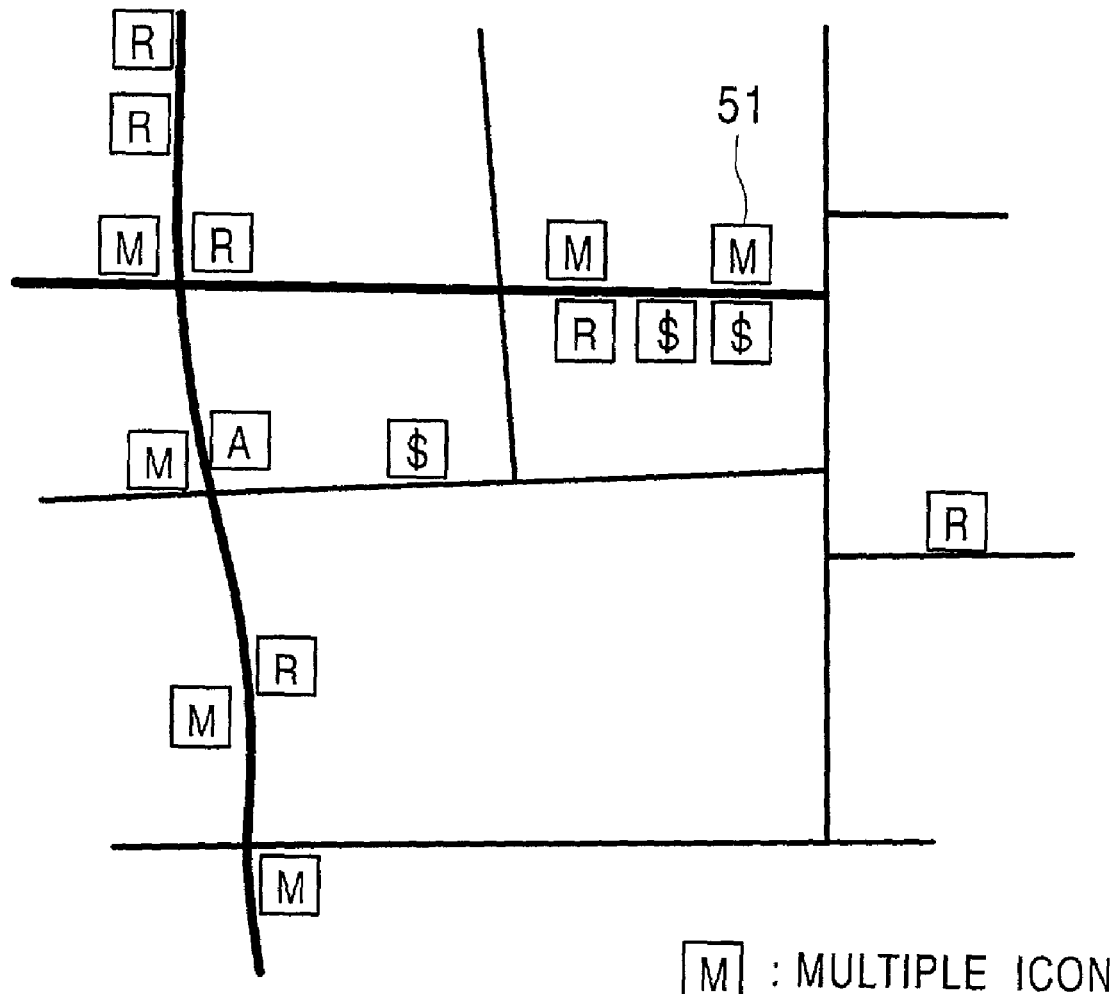
FIG. 8 shows an example of the display of POI icons according to the first embodiment of the present invention.
Figure 13:
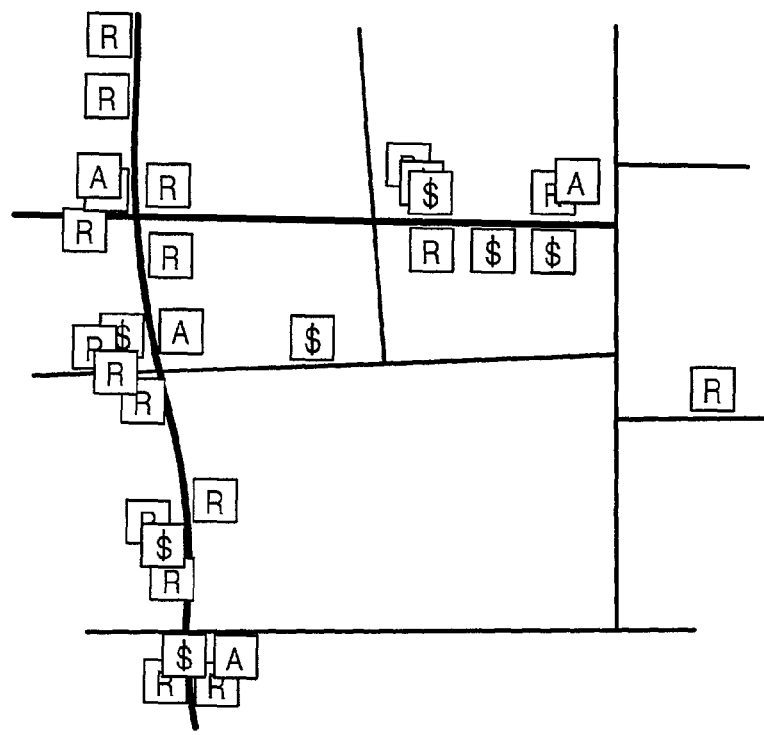
FIG. 13 shows an example of the conventional display of POI icons.
Figure 14:
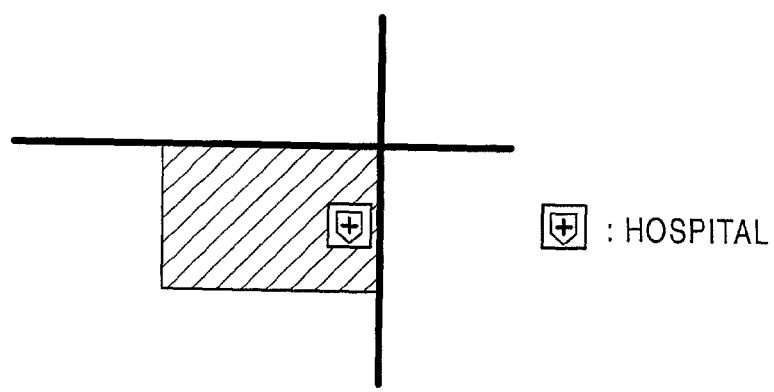
FIG. 14 shows an example of a conventional display in which a POI is displayed using a polygon and a POI icon.

Among the POI icons displayed on a map, the set of POI icons for which the display positions are the same or are in close proximity to each other and overlap is determined, and the overlapping POI icons are collected under one representative icon (multiple-icon icon) and are displayed (step 101). As a result, the POI icons of FIG. 13 are displayed as shown in FIG. 8, the number of POI icons is reduced, and there is no case in which a road on the map is obscured.

Figure 9A:
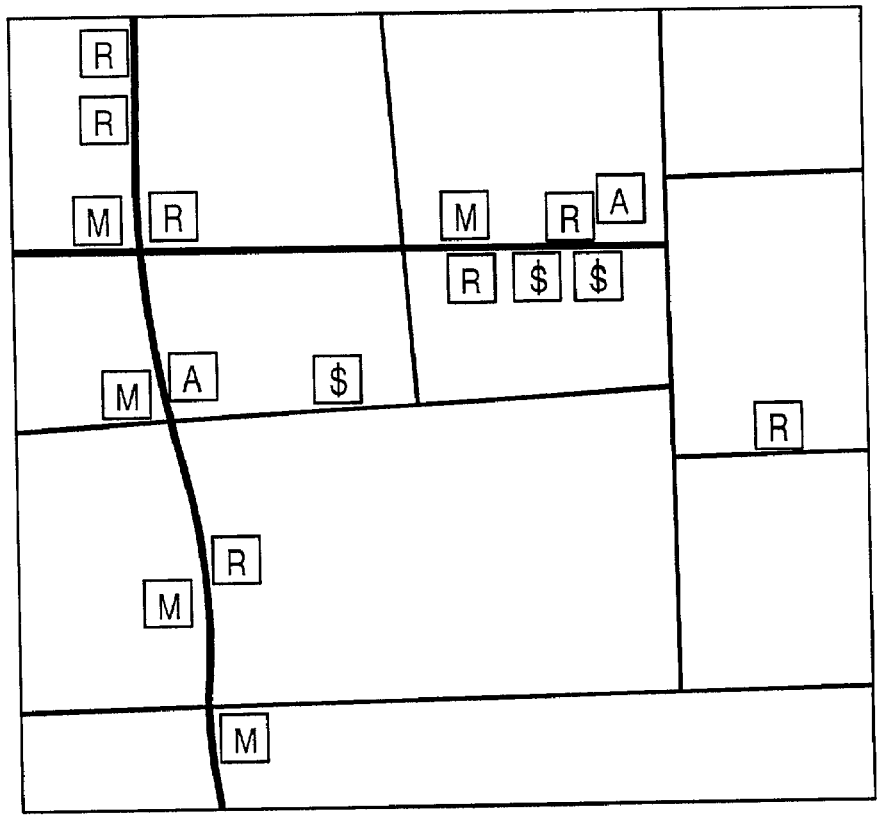
Figure 9B:
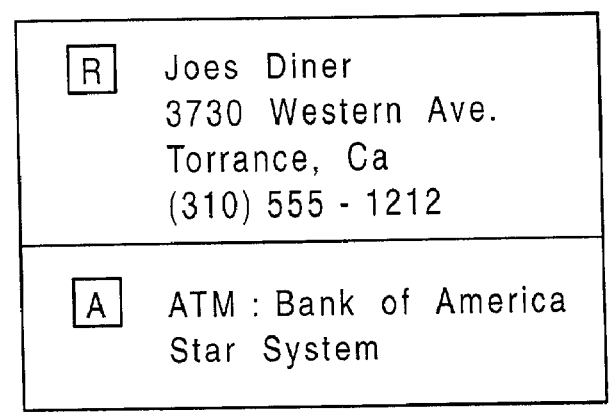

In such a state, when a predetermined multiple-icon icon 51 (FIG. 8) is selected using the cursor (step 102), the navigation apparatus displays the original individual POI icons instead of the multiple-icon icon, as shown in FIG. 9A, or displays the detailed information (name, address, telephone number, etc.) of the POIs corresponding to the original individual POI icons in such a manner as to overlap the map (step 103), as shown in FIG. 9B. Thereafter, when "return" is instructed by a remote control operation (step 104), the process returns to the display in FIG. 8, and the display process of step 101 and subsequent steps is performed.

In the manner described above, according to the first embodiment, since overlapping POI icons are displayed using one multiple-icon icon, the number of POI icons displayed on the map is reduced, and roads are readily visible.

In the foregoing, although a case is described in which overlapping POI icons are represented by one multiple-icon icon, when a large number of POI icons are densely displayed, the POI icons also can be represented by one multiple-icon icon and displayed without overlap. For example, various methods are described below:

(1) When icons of a set number or more are present within a predetermined distance on the same street or between intersections, these icons are represented by one multiple-icon icon and displayed, or (2) The total icon area displayed on the screen is calculated to determine the icon density. When the density is equal to or greater than a predetermined value, the icons are grouped into a multiple-icon icon until the density falls below the predetermined value, or (3) If the number of icons displayed in a predetermined area is equal to or greater than a predetermined value, these icons are displayed by a multiple-icon icon.

Figure 10:
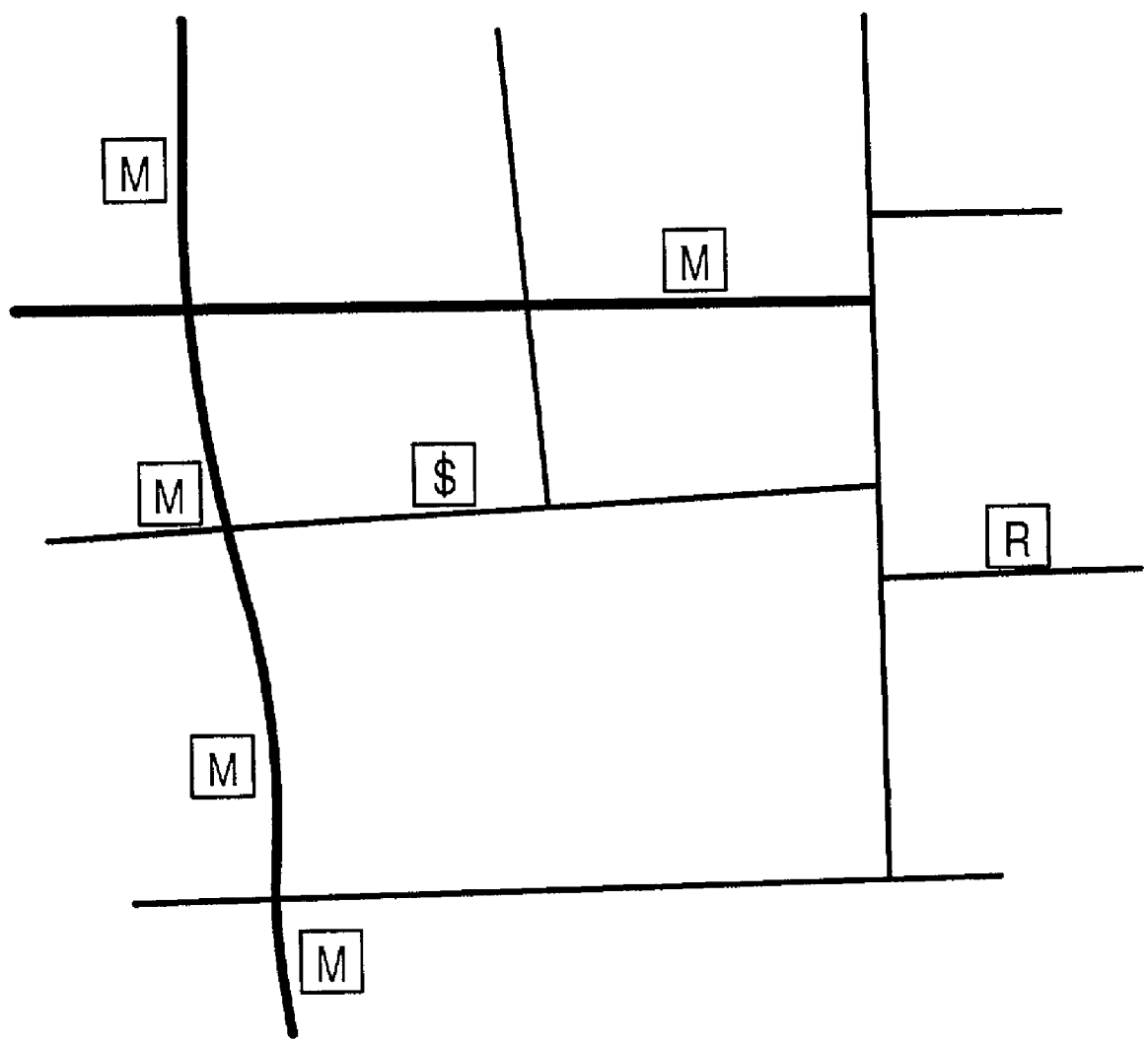
FIG. 10 shows a modification of the POI icon display of the first embodiment.

FIG. 10 shows an example in which when four or more POI icons are present between intersections, these are displayed by one multiple-icon icon.

(D) Second Embodiment

Figure 11:
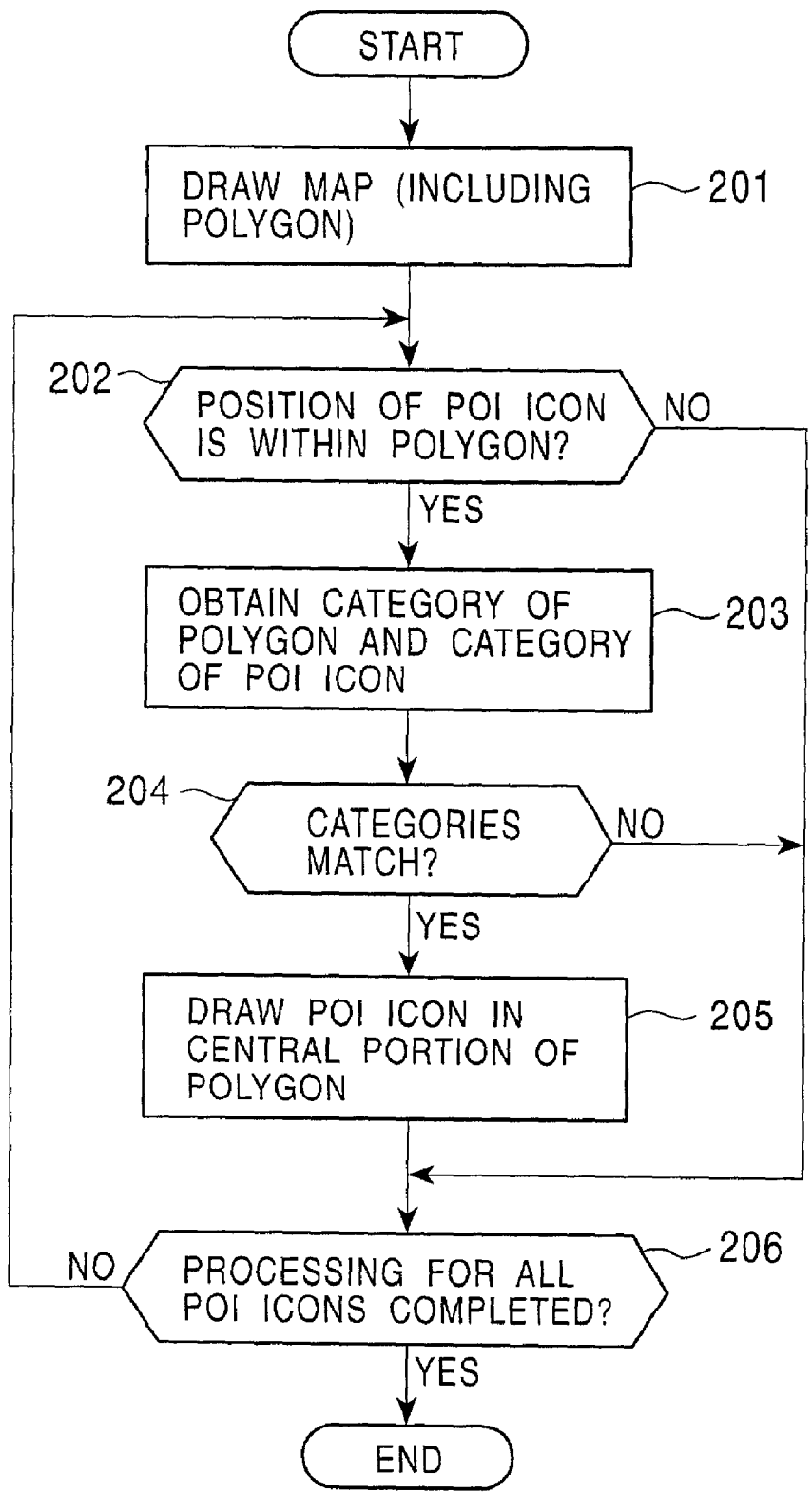
FIG. 11 is a flowchart of a POI icon display process according to a second embodiment of the present invention.

FIG. 11 is a flowchart of a POI icon display process according to a second embodiment of the present invention.

Initially, a map is drawn on a screen. In this case, POIs (facilities) having large premises, such as parks, factories, hospitals, and sports facilities, are displayed by polygons (step 201). Then, whether a POI icon is present within the polygon is determined (step 202).

If a POI icon is determined to be inside a predetermined polygon in step 202, the category data contained in the figure information of the polygon and the category data contained in the POI icon information are obtained (step 203). A check is made to determine whether the category of the polygon matches the category of the POI icon (step 204). If they match, the POI icon is drawn in the central portion of the polygon (step 205). In the above, if no action were taken, the POI icon would have been drawn at the end of the polygon (see FIG. 12A), but in the process of step 205, the POI icon is drawn in the central portion of the polygon, as shown in FIG. 12B.

Thereafter, a check is made to determine whether the above-described processing has been performed for all the POI icons (step 206). If the processing has not been completed, the processing of step 202 and subsequent steps is performed.

In the foregoing, it is determined whether categories match for the purpose of confirmation. This confirmation process need not necessarily be carried out, and steps 203 and 204 can be omitted.

As has thus been described, according to the present invention, since an POI icon is displayed automatically in the central portion of a POI polygon, it is possible to perform an operation for selecting a more readily distinguishable POI icon with higher accuracy.

As many different embodiments of the present invention can be made without departing from the spirit and scope of the invention, it is to be understood that the invention is not limited to the specific embodiments thereof except as defined in the appended claims.

The invention claimed is:

1. A point-of-interest icon display method in a navigation apparatus for displaying on a screen two-dimensional point-of-interest icons at positions of points of interest on a displayed map, said method comprising:
   displaying multiple point-of-interest icons using one representative icon when the areas of multiple point-of-interest icons are densely distributed on the displayed map;
   wherein the act of displaying comprises calculating the total area of the icons displayed on the screen in order to determine an icon density, and when the density is equal to or greater than a predetermined value, grouping the icons into multiple-icon icons until the density falls below the predetermined value, where the area of a multiple-icon icon is less than the combined areas of the individual point-of-interest icons it replaces.

2. A point-of-interest icon display method in a navigation apparatus for displaying two-dimensional point-of-interest icons at positions of points of interest on a map, said method comprising:
   displaying multiple point-of-interest icons using one representative icon when the areas of multiple point-of-interest icons are densely distributed on the map;
   wherein the act of displaying comprises determining the number of icons present within a predetermined distance along a street or between intersections along a street and displaying multiple icons along the street by a representative multiple-icon icon when the determined number of icons is a set number or more.

3. A point-of-interest icon display method according to claim 1, comprising: displaying the original individual point-of-interest icons instead of a representative multiple-icon icon when said representative icon is selected.

4. A point-of-interest icon display method according to claim 1, comprising: displaying information relating to the points of interest corresponding to the original individual point-of-interest icons when said representative icon is selected.

5. A point-of-interest icon display method according to one of claims 3 and 4, comprising: displaying the multiple-icon icon instead of the original individual point-of-interest icons when a return instruction is provided.

6. A navigation apparatus, for mounting in a vehicle, for displaying on a screen two-dimensional point-of-interest icons at positions of points of interest on a displayed map, said navigation apparatus comprising:
   a control section for displaying multiple point-of-interest icons using one representative icon when the areas of multiple point-of-interest icons are densely distributed on the displayed map;
   wherein said control section calculates the total area of the icons displayed on the screen in order to determine an icon density, and when the density is equal to or greater than a predetermined value, groups the icons into multiple-icon icons until the density falls below the predetermined value, where the area of a multiple-icon icon is less than the combined areas of the individual point-of-interest icons it replaces.

7. A navigation apparatus for mounting in a vehicle, for displaying two-dimensional point-of-interest icons at positions of points of interest on a map, said navigation apparatus comprising:
a control section for displaying multiple point-of-interest icons using one representative icon when the areas of multiple point-of-interest icons are densely distributed on the map;
wherein said control section determines the number of icons present within a predetermined distance along a street or between intersections along a street and displays multiple icons along the street using a representative multiple-icon icon when the determined number of icons is a set number or more.

8. A navigation apparatus according to claim 6, wherein, when said representative icon is selected, said control section displays the original individual point-of-interest icons instead of the representative multiple-icon icon.

9. A navigation apparatus according to claim 6, wherein, when said representative icon is selected, said control section displays information relating to the points of interest corresponding to the original individual point-of-interest icons instead of the multiple-icon icon.

10. A navigation apparatus according to one of claims 8 and 9, wherein, when a return instruction is provided, said control section displays the multiple-icon icon instead of the original individual point-of-interest icons.

* * * * *